(12) United States Patent
Li

(10) Patent No.: US 11,802,507 B2
(45) Date of Patent: Oct. 31, 2023

(54) DUAL-PRESSURE JET ENGINE AND DEVICE FOR WORK DONE BY COMPRESSED AIR THEREOF

(71) Applicant: Yunfeng Li, Jiangsu (CN)

(72) Inventor: Yunfeng Li, Jiangsu (CN)

( * ) Notice: Subject to any disclaimer, the term of this patent is extended or adjusted under 35 U.S.C. 154(b) by 0 days.

(21) Appl. No.: 18/066,167

(22) Filed: Dec. 14, 2022

(65) Prior Publication Data

US 2023/0175434 A1 Jun. 8, 2023

Related U.S. Application Data

(63) Continuation of application No. PCT/CN2022/107595, filed on Jul. 25, 2022.

(30) Foreign Application Priority Data

Dec. 6, 2021 (CN) .......................... 202123036660.X

(51) Int. Cl.
F02C 3/055 (2006.01)
F02C 7/22 (2006.01)

(52) U.S. Cl.
CPC .............. F02C 3/055 (2013.01); F02C 7/22 (2013.01); *F05D 2220/323* (2013.01)

(58) Field of Classification Search
CPC .... F02C 3/055; F02C 7/22; F02C 5/00; F05D 2220/323; F02K 3/10
See application file for complete search history.

(56) References Cited

U.S. PATENT DOCUMENTS

| 2,358,815 A | * | 9/1944 | Lysholm | ................. F04C 28/02 290/40 R |
| 2,385,366 A | * | 9/1945 | Lysholm | ................. F02C 3/055 60/248 |
| 2007/0175202 A1 | * | 8/2007 | Murrow | .................... F03C 2/08 418/48 |
| 2009/0158739 A1 | * | 6/2009 | Messmer | .............. F01K 21/047 60/648 |

FOREIGN PATENT DOCUMENTS

| CN | 216429936 | 5/2002 | | |
| CN | 101319641 | 12/2008 | | |
| CN | 105484804 | 4/2016 | | |
| EP | 3318743 A1 | * 5/2018 | ............. B64D 13/06 |

(Continued)

*Primary Examiner* — Steven M Sutherland
(74) *Attorney, Agent, or Firm* — Levine Bagade Han LLP

(57) ABSTRACT

A device for work done by compressed air and a dual-pressure jet engine thereof are provided, a first compressed air storage chamber for cooperating with the air intake compressor is arranged between the air intake compressor and the screw gas compressor so as to pressurize the air. The first compressed air storage chamber is communicated with the screw gas compressor, the air intake end of the screw gas compressor is provided with the fuel injection mechanism for injecting fuel inside the screw gas compressor. The air outlet end of the screw gas compressor is provided with the second compressed air storage chamber for cooperating with the screw gas compressor so as to pressurize the air. The second compressed air storage chamber is communicated with the combustion chamber which is used to be injected with fuel.

13 Claims, 3 Drawing Sheets

(56) References Cited

FOREIGN PATENT DOCUMENTS

| GB | 9602118 | 4/1996 | | |
|----|---------|--------|----|----|
| JP | 1986/031619 | 2/1986 | | |
| KR | 1999/0054833 | 7/1999 | | |
| KR | 2013/0067991 | 6/2013 | | |
| WO | WO 9323659 | 11/1993 | | |
| WO | WO-2004029432 A2 * | 4/2004 | ............... | F01D 1/34 |

* cited by examiner

US 11,802,507 B2

DUAL-PRESSURE JET ENGINE AND DEVICE FOR WORK DONE BY COMPRESSED AIR THEREOF

CROSS REFERENCE TO RELATED APPLICATION

This application claims the priority of Chinese Patent Application No.202123036660.X, entitled "DUAL-PRESSURE JET ENGINE AND DEVICE FOR WORK DONE BY COMPRESSED AIR THEREOF" filed with the Chinese Patent Office on Dec. 06, 2021 which is incorporated herein by reference in its entirety.

TECHNICAL FIELD

The present disclosure relates to the technical field of aircraft engines, in particular to a dual-pressure jet engine and a device for work done by compressed air thereof.

BACKGROUND

The existing jet engine has the disadvantages of complex manufacturing process, high manufacturing requirement, high cost and high fuel consumption. Therefore, the patent document No.CN105484804A discloses a jet engine, which includes a blast drum, a gyroscope-type fan, generators, a gyroscope-type generator and a fairing. The gyroscope-type fan, the generators and the gyroscope-type generator are installed on an axis of the blast drum, and the fairing is fixedly installed outside the blast drum. The gyroscope-type fan is driven to rotate at a high speed through external electric energy, so as to drive a plurality of generators to generate electricity. The electricity generated by the plurality of generators is also provided to the gyroscope-type fan for use, and then the plurality of generators are continuously driven to generate electricity. Thus, the above process is circled repeatedly, and a working process of a jet engine is formed. However, the jet engine inevitably has a great overall structure due to its more turbofans, thus a high requirement on the manufacturing process thereof is put forward. The patent document No. CN101319641A discloses a rotating wheel jet engine, which includes a rotating wheel, a gas compressor, a hollow fixed axis, a power output shaft, a gas collecting tile and the like. One side of the hollow disk-shaped rotating wheel of the rotating wheel jet engine is fixed with the power output shaft while the other side of the rotating wheel is connected to a support wheel, the gas compressor and a fan. The hollow fixed axis and the power output shaft are all supported by an engine base, and a cavity inside the rotating wheel is a combustion chamber. A plurality of air injection pipes communicating with the combustion chamber are arranged at an edge of the rotating wheel. One end of the hollow fixed axis extends into the combustion chamber through an opening, and a hollow part of the hollow fixed axis is a pipeline for conveying fuel. A stock screw or a fuel injection pipe is arranged in the pipeline. The gas collecting tile for collecting waste gas is arranged at a periphery of the rotating wheel. The rotating wheel jet engine can not only take gasoline as fuel, but also take coal as fuel. The fuel burns in the combustion chamber, and the reaction force of the injection gas results in a pushing effect. However, the gas is easy to leak from a seam of the rotating wheel jet engine, so the rotating wheel jet engine is not reliable and will inevitably affect the efficiency of the engine.

SUMMARY

The purpose of some embodiments is to provide a dual-pressure jet engine and a device for work done by compressed air thereof, so as to solve the above mentioned problem in the prior art. By using a turbofan and mechanical dual-pressurization mode, a jet engine has partial advantages of a cylinder engine, thereby achieving the purposes of saving the manufacturing cost, simplifying the structure, effectively reducing fuel consumption and improving voyage.

In order to achieve the above purpose, some embodiments provide the technical solutions as follows.

The present disclosure provides a device for work done by compressed air, including an inner casing and a main shaft, where the main shaft extends in the inner casing along an axial direction of the inner casing, where an air intake compressor and a screw gas compressor are successively provided on the main shaft along a gas flowing direction, the inner casing is provided with an inner duct for introducing air into the air intake compressor at a front end of the air intake compressor, a first compressed air storage chamber for cooperating with the air intake compressor is arranged between the air intake compressor and the screw gas compressor, the air intake compressor is configured to pressurize the air, the first compressed chamber communicates with the screw gas compressor, an air intake end of the screw gas compressor is provided with a fuel injection mechanism for injecting fuel inside the screw gas compressor, an air outlet end of the screw gas compressor is provided with two second compressed air storage chambers, the screw gas compressor is configured to pressurize air, the two second compressed air storage chambers communicate with a combustion chamber, the combustion chamber is configured to be injected with fuel, and an ignition mechanism for detonating a mixture of the fuel and the air is arranged in the combustion chamber.

Preferably, the fuel injection mechanism includes an injection nozzle of the screw gas compressor, the injection nozzle of the screw gas compressor faces to an inlet of the screw gas compressor and injects the fuel inside the screw gas compressor, and a fuel collecting pipeline for collecting and recycling the fuel flowing out of the screw gas compressor is arranged at lower portions inside the two second compressed air storage chambers.

Preferably, a one-way intake valve is arranged at an outlet of the screw gas compressor, and the one-way intake valve is configured to allow only the air to enter the two second compressed air storage chambers.

Preferably, the two second compressed air storage chamber are each provided with a first exhaust port, the first exhaust port communicates with the combustion chamber, the first exhaust port is provided with a first valve stem, and the first valve stem is sleeved with a first reset spring; one side, away from the first exhaust port, of the first valve stem is provided with a cam shaft; and the cam shaft is configured to synchronously rotate with the main shaft and to push the first valve stem to block the first exhaust port.

Preferably, the two second compressed air storage chambers are both communicate with the screw gas compressor, and are arranged symmetrically about the main shaft; the first exhaust port and the first valve stem are coordinately arranged in one of the two second compressed air storage chambers, a second exhaust port is arranged on an other one of the two second compressed air storage chambers and is symmetrical to the first exhaust port about the cam shaft, the second exhaust port is provided with and cooperates with a second valve stem and a second reset spring, the second reset spring is sleeved on the second valve stem, and the second valve stem and the first valve stem are arranged symmetrically with respect to the cam shaft.

Preferably, a sensor is arranged on the first valve stem or the second valve stem, and the sensor is configured to monitor an action of the first valve stem or the second valve stem, and is electrically connected to the ignition mechanism.

Preferably, the screw gas compressor comprises a gas compressor casing, and a screw structure is arranged inside the gas compressor casing; or, a three-screw structure with one male screw and two female screws is arranged inside the gas compressor casing, the three-screw structure comprises a male screw and two female screws, the male screw is coaxially connected and rotated with the main shaft, the two female screws are symmetrically arranged about the male screw and in transmission connection with the male screw, and the female screws are rotationally arranged on the gas compressor casing.

The present disclosure further provides a dual-pressure jet engine, including the above device for work done by compressed air and a main casing sleeved outside the device for work done by compressed air, where two ends of the main casing are opened so as to form an inlet port and an outlet port, individually; a main air intake fan is arranged inside the inlet port of the main casing and communicates with the inner duct, and the outlet port of the main casing is provided with a main pushing chamber; the main pushing chamber communicates with the combustion chamber, the main shaft extends into the main pushing chamber and is coaxially sleeved with a high pressure turbine, the high pressure turbine directly faces to an air outlet of the combustion chamber, an outer duct is arranged between the main casing and the device for work done by compressed air, the outer duct and the inner duct communicate with the inlet port in parallel, and two airway turbofans for pressurizing the air in the outer duct are arranged between the high pressure turbine and the main pushing chamber.

Preferably, the two airway turbofans are arranged side by side along an air flowing direction, and are both coaxially arranged with the high pressure turbine.

Preferably, a tail cone is arranged in the main pushing chamber, the tail cone is connected and rotated coaxially with an end part of the main shaft, and the high pressure turbine and the two airway turbofans are each coaxially connected to the tail cone.

Compared with the prior art, the present disclosure has obtained the following technical effects.

First, the air intake compressor and the screw gas compressor is successively provided on the main shaft along the gas flowing direction. The inner casing is provided with the inner duct at the front end of the air intake compressor for introducing the air into the air intake compressor, and the first compressed air storage chamber for cooperating with the air intake compressor is arranged between the air intake compressor and the screw gas compressor so as to pressurize the air. The first compressed air storage chamber communicates with the screw gas compressor, and the air intake end of the screw gas compressor is provided with the fuel injection mechanism for injecting fuel inside the screw gas compressor. The air outlet end of the screw gas compressor is provided with the second compressed air storage chamber for cooperating with the screw gas compressor so as to pressurize the air. The second compressed air storage chamber communicates with the combustion chamber which is used to be injected with fuel. The ignition mechanism for detonating the fuel and air mixture is arranged in the combustion chamber. The air passes through the air intake compressor firstly and is pressurized to the first compressed air storage chamber for the first time by the air intake compressor under the pushing force action of the air intake compressor, and the compressed air forms primary compressed air. The primary compressed air enters the screw gas compressor to be compressed for the second time and then enters the second compressed air storage chamber. At the same time, the primary compressed air is mixed with the fuel sprayed out by the fuel injection mechanism in the screw gas compressor. The air which is compressed twice is collected in the combustion chamber and forms huge air pressure along the ignition of the fuel, so that the engine power is effectively improved.

Second, the injection nozzle of the screw gas compressor faces to the inlet of the screw gas compressor and injects the fuel inside the screw gas compressor, so as to achieve two purposes that lubrication and combustion are achieved. The injection nozzle of the screw gas compressor can not only lubricate the screw which rotates in the screw gas compressor, but also mix with the air in the screw gas compressor fully. The fuel collecting pipeline for collecting and recycling the fuel flowing out of the screw gas compressor is arranged at a lower portion inside the second compressed air storage chamber. The fuel collecting pipeline can absorb the fuel quickly and prevent the fuel from being centralized in the second compressed air storage chamber and thus prevent affecting the compression on the air again. And, the fuel collecting pipeline can further effectively prevent the fuel from being collected in the second compressed air storage chamber and thus prevent resulting in a risk of blocking the exhaust port of the second compressed air storage chamber.

Third, the one-way intake valve, through which only air can enter the second compressed air storage chamber, is arranged at the outlet of the screw gas compressor, so as to prevent the fuel and air, which are mixed, reversely flowing into the screw gas compressor and thus affecting the air compression effect.

Fourth, the second compressed air storage chamber includes two second compressed air storage chambers that each communicate with the screw gas compressor. The two second compressed air storage chambers are arranged symmetrically about the main shaft. The first exhaust port and the first valve stem are coordinately arranged on one of the second compressed air storage chambers. The second exhaust port, which is symmetrical to the first exhaust port about the cam shaft, is arranged on the other one of the second compressed air storage chambers. The second exhaust port is provided with the second valve stem, and the second reset spring sleeved on the second valve stem. The second valve stem and the first valve stem are arranged symmetrically with respect to the cam shaft. The first valve stem and the first exhaust port, as well as the second valve stem and the second exhaust port are alternatively and cooperatively used. So, it can be ensured that the combustion chamber is continuously work done during the working process of the engine, so that the continuous operation of the whole engine is ensured. Further, under the situation that the combustion chamber does not do work, it can avoid that the single valve stem is cooperated with the single exhaust port to affect the working efficiency of the engine.

Fifth, two ends of the main casing are opened so as to form an inlet port and an outlet port, individually. The main air intake fan is arranged inside the inlet port of the main casing and communicates with the inner duct, and the outlet port of the main casing is provided with the main pushing chamber that communicates with the combustion chamber. The main shaft extends into the main pushing chamber and is coaxially sleeved with the high pressure turbine which directly faces to the air outlet of the combustion chamber. The outer duct is arranged between the main casing and the device for work done by compressed air. The outer duct and the inner duct communicate with the inlet port in parallel. The two airway turbofans for pressurizing the air in the outer duct are arranged between the high pressure turbine and the main pushing chamber. The air entering from the outer duct is pushed to the airway turbofans through the main air intake fan so as to be compressed for the second time. Then, the air enters the main pushing chamber and burns together with the fuel sprayed out of the nozzle in the main pushing chamber so as to form a burned gas. Then, the burned gas and the gas sprayed out of the combustion chamber are sprayed from the opening at the tail part of the main casing, so that the purposes of making the engine run and greatly reducing the quantity of the turbofans are achieved. Compared with the traditional turbojet engine, the dual-pressure jet engine has smaller volume, and the requirements on the manufacturing process of the dual-pressure jet engine are reduced.

BRIEF DESCRIPTION OF THE DRAWINGS

To better clarify the embodiment of the present disclosure or the technical solution in the prior art, the drawings which is required to illustrate the embodiments will be simply described below. It is apparent that the drawings described below merely illustrate some embodiments of the present disclosure. Those of ordinary skill in the art can obtain other drawings without creative labor on the basis of those drawings.

In the figures: 1 main shaft; 2 main air intake fan; 3 main casing; 4 air intake compressor; 5 first compressed air storage chamber; 6 screw gas compressor; 7 second compressed air storage chamber; 8 first valve stem; 9 cam shaft; 10 high pressure turbine; 11 airway turbofan; 12 tail cone; 13 combustion chamber; 14 injection nozzle of the screw gas compressor; 15 ignition plug; 16 oxygen aeration pipe; 17 reset spring; 18 inner casing; 19 main pushing chamber; 20 generator; 21 dual-starter; 22 semicircular nozzle.

DETAILED DESCRIPTION OF THE EMBODIMENTS

The technical solutions of the embodiments of the present disclosure are clearly and completely described below in combination with the drawings of the embodiments of the present disclosure. It is apparent that the described embodiments are only a part rather than all of the embodiments of the present disclosure. Based on the embodiments of the present disclosure, other embodiments obtained by those of ordinary skill in the art on the premise of not paying any creative efforts all belong to the protection scope of the present disclosure.

The purpose of some embodiments is to provide a dual-pressure jet engine and a device for work done by compressed air thereof, so as to solve the above described problem in the prior art. By using a turbofan and mechanical dual-pressurization mode, the jet engine has partial advantages of a cylinder engine, so that the purposes of saving the manufacturing cost, simplifying the structure, effectively reducing fuel consumption and improving voyage are achieved.

In order to make the above purposes, features and advantages of the present disclosure more apparent and understandable, the present disclosure will be further described in details below in combination with the drawings and specific embodiments.

Figure 1:
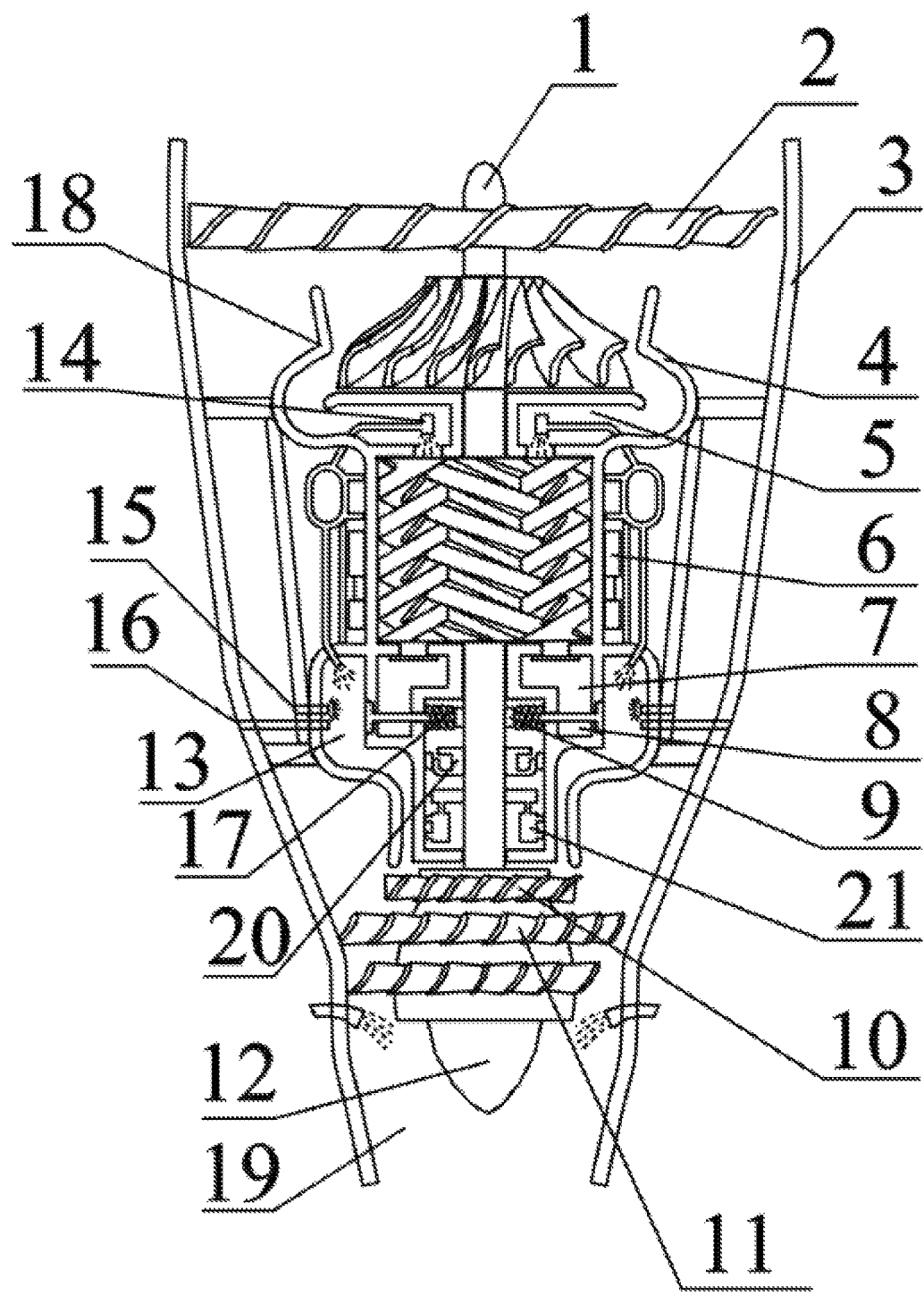
FIG. 1 is a section view of an overall structure of a dual-pressure jet engine including a device for work done by compressed air according to embodiments of the present disclosure.
Figure 2:
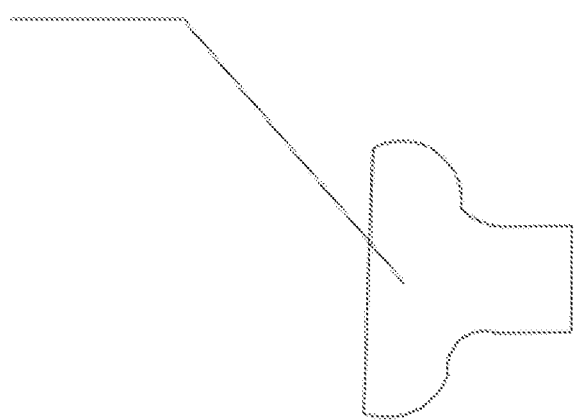
FIG. 2 is a structural view of a combustion chamber according to embodiments of the present disclosure.
Figure 3:
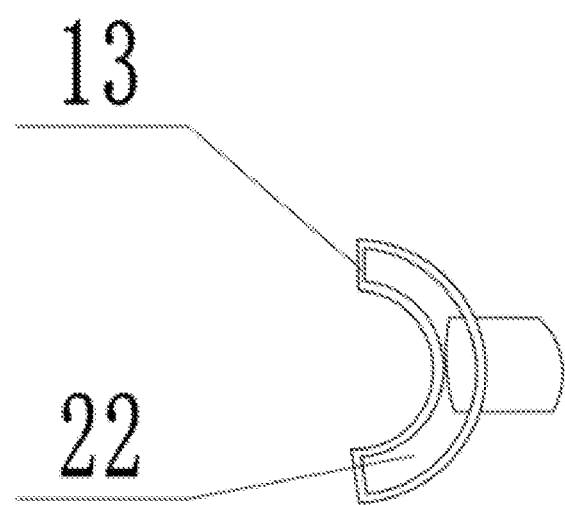
FIG. 3 is a section view of the combustion chamber according to embodiments of the present disclosure.

Referring to FIG. 1 to FIG. 3, the present disclosure provides a device for work done by compressed air. The device for work done by compressed air includes an inner casing 18 and a main shaft 1 which is extended in the inner casing 18 along an axial direction thereof, where the main shaft 1 is successively provided with an air intake compressor 4 and a screw gas compressor 6 along a gas flowing direction. Through a small transformation of a part of the device for work done by compressed air, the device for work done by compressed air may act as an output of the turboprop engine or a turboshaft engine. Namely, the device has the multi-purpose characteristic. The inner casing 18 is provided with an inner duct for introducing the air into the air intake compressor 4 at a front end of the air intake compressor 4, and a first compressed air storage chamber 5 for cooperating with the air intake compressor 4 is arranged between the air intake compressor 4 and the screw gas compressor 6, so that the air intake compressor 4 can pressurize air. The first compressed air storage chamber 5 communicates with the screw gas compressor 6, and an air intake end of the screw gas compressor 6 is provided with a fuel injection mechanism for injecting fuel inside the screw gas compressor 6. An air outlet end of the screw gas compressor 6 is provided with a second compressed air storage chamber 7 for cooperating with the screw gas compressor 6 so as to pressurize the air. The second compressed air storage chamber 7 communicates with a combustion chamber 13 which is used to be injected with fuel. An ignition mechanism for detonating the fuel and air mixture is arranged in the combustion chamber 13. The air passes through the air intake compressor 4 firstly and is pressurized to the first compressed air storage chamber 5 for the first time by the air intake compressor 4 under the pushing force action of the air intake compressor 4. The compressed air thus forms primary compressed air. The primary compressed air enters the screw gas compressor 6 to be compressed for the second time, and then enters the second compressed air storage chamber 7. At the same time, the primary compressed air is mixed with the fuel sprayed out of the fuel injection mechanism in the screw gas compressor 6. The air which is compressed twice is collected in the combustion chamber 13 and forms huge air pressure along the ignition of the fuel, so that the engine power is effectively improved. Preferably, the turbine is a centrifugal turbine, so as to improve the compression force on the air. A nozzle of a lubricating fuel is arranged in the combustion chamber 13, and the lubricating fuel achieves two purposes that are lubrication and combustion. Preferably, in order to simplify an overall structure of the device, the combustion chamber 13 is superimposed outside the second compressed air storage chamber 7 to form an integrated structure with the second compressed air storage chamber 7. One or two direct injection fuel nozzles, one or two ignitors or ignition plugs 15, an oxygen aeration pipe 16, and a plurality of sensors and other devices are arranged inside a single combustion chamber 13.

Further, the fuel injection mechanism includes an injection nozzle of the screw gas compressor 14, which faces to the inlet of the screw gas compressor 6 and injects the fuel inside the screw gas compressor 6. So, both lubrication and combustion are achieved. The fuel injected via the nozzle of the screw gas compressor 14 can not only lubricate the screw which rotates in the screw gas compressor 6, but also mix with the air in the screw gas compressor 6 fully. A fuel collecting pipeline for collecting and recycling the fuel flowing out of the screw gas compressor 6 is arranged at a lower portion inside the second compressed air storage chamber 7. The fuel collecting pipeline can absorb the fuel quickly and prevent the fuel from being centralized in the second compressed air storage chamber 7 and thus prevent affecting the compression on the air again. And, the fuel collecting pipeline can further effectively prevent the fuel from being collected in the second compressed air storage chamber 7 and thus prevent resulting in a risk of blocking the exhaust port of the second compressed air storage chamber 7.

Further, a one-way intake valve, through which only air can enter the second compressed air storage chamber 7, is arranged at the outlet of the screw gas compressor 6, so as to prevent the mixed fuel and air reversely flowing into the screw gas compressor 6 and affecting the air compression effect.

Further, the second compressed air storage chambers 7 includes two second compressed air storage chambers 7 that all communicate with the screw gas compressor 6. The two second compressed air storage chambers 7 are arranged symmetrically about the main shaft 1. The first exhaust port and the first valve stem 8 are coordinately arranged on one of the second compressed air storage chambers 7. A second exhaust port which is symmetrical to the first exhaust port about the cam shaft is arranged in the other one of the second compressed air storage chambers 7. The second exhaust port is provided with a second valve stem and a second reset spring 17 sleeved on the second valve stem, and the second valve stem and the first valve stem 8 are arranged symmetrically with respect to the cam shaft 9. The first valve stem 8 and the first exhaust port, as well as the second valve stem and the second exhaust port are alternatively and cooperatively used. So, it can be ensured that the combustion chamber 13 is continuously work done during the working process of the engine, so that the continuous operation of the whole engine is ensured. Further, under the situation that the combustion chamber 13 does not do work, it can avoid that the single valve stem is cooperated with the single exhaust port to affect the working efficiency of the engine.

As a preferred embodiment of the present disclosure, the two second compressed air storage chambers 7 are arranged at intervals. A dual-starter 21, a generator 20, a position sensor and other devices are arranged on the main shaft 1 which is located between the two second compressed air storage chambers 7. The dual-starter, the generator 20, the position sensor and other devices are covered at an inside end of a diversion shell which is integrated with the two second compressed air storage chambers 7 and the combustion chamber 13.

Further, a sensor for monitoring the action of the first valve stem 8 or the second valve stem is arranged on the first valve stem 8 or the second valve stem. The sensor is electrically connected to the ignition mechanism, the sensor sends out a signal to the ignition plug when sensing that the first valve stem 8 or the second valve stem drops. At this time, the fuel mixed gas in the combustion chamber 13 is ignited by the ignition plug so as to make the fuel mixed gas explode, burn and generate pulse gas, which is sprayed from the combustion chamber 13. So, a high pressure turbine 10 is pushed to do work.

Where the screw gas compressor 6 includes a gas compressor casing, in which a screw structure is arranged. Preferably, the screw structure is a three-screw structure with one male screw and two female screws. The three-screw structure includes a male screw which is coaxially connected and rotates with the main shaft 1, and two female screws that are symmetrically arranged about the male screw and in transmission connection with the male screw. The female screws are rotationally arranged on the gas compressor casing. During use, the male screw drives the two female screws to rotate, so as to improve the air compression ability. Optionally, in order to the air compression ability, a single-screw structure, a double-screw structure or other multi-screw structures and the like may be selected. Preferably, the high pressure fuel tank, the high pressure fuel pipe, the battery, the computer board, the sensor and other accessory devices are arranged outside the gas compressor casing.

Further, according to the different application scenarios, the main part of the device for work done by compressed air in the present disclosure may be designed to be cooled through an air cooling mode or a water cooling mode.

A dual-pressure jet engine is further provided. The dual-pressure jet engine includes the above device for work done by compressed air and a main casing 3 sleeved outside the device for work done by compressed air. Preferably the device for work done by compressed air is fixed with the main casing 3 through a plurality of supports. Two ends of the main casing 3 are opened so as to form an inlet port and an outlet port, individually. A main air intake fan 2 is arranged inside the inlet port of the main casing 3 and communicates with an inner duct. The outlet end of the main casing 3 is provided with a main pushing chamber 19 communicating with the combustion chamber 13. The main shaft 1 extends into the main pushing chamber 19 and is coaxially sleeved with a high pressure turbine 10 which directly faces to the air outlet of the combustion chamber 13. Preferably, the combustion chamber 13 is provided with two semicircular nozzles 22 which directly face to the high pressure turbine 10. The gas in the combustion chamber 13 is sprayed out of the semicircular nozzles. An outer duct is arranged between the main casing 3 and the device for work done by compressed air. The outer duct and the inner duct communicate with the inlet port in parallel. Airway turbofans 11 for pressurizing the air in the outer duct are arranged between the high pressure turbine 10 and the main pushing chamber 19. The air entering from the outer duct is pushed to the airway turbofans 11 through the main air intake fan 2 so as to be compressed for the second time, then enters the main pushing chamber 19 and burns together with the fuel sprayed out of the nozzle in the main pushing chamber 19. So, a burned gas is formed, and then the burned gas and the gas sprayed out of the combustion chamber 13 are sprayed from the opening at the tail part of the main casing 3. Thus, the purposes of making the engine run and greatly reducing the quantity of the turbofans are achieved. Compared with the traditional turbojet engine, the dual-pressure jet engine has smaller volume and the requirements on the manufacturing process of the dual-pressure jet engine are reduced. The air in the outer duct enters the main pushing chamber 19, which mainly provides the main oxygen-containing compression air to a force applying device. The nozzle in the main pushing chamber 19 is a force applying nozzle, and is provided with a force applying fuel injection device. After the air and the gas in the combustion chamber 13 enter the main pushing chamber 19, the fuel is injected for burning and explosion, so that the pushing force of the engine is improved. Preferably, when the engine runs, the quantity of the fuel injected in the combustion chamber 13 may be accurately controlled according to the working conditions, and a plurality of fuel injection modes can be provided, so as to effectively control the fuel consumption. Preferably, the diversion shell is exposed in and cooled by the air which flows through the outer duct.

Since the fuel is controllable directly injected and the high pressure gas are burnt to do work in the small combustion chamber 13, the principle of the engine is similar to a direct injection engine of an automobile, so as to obviously save fuel and improve economy. When the engine is in a high altitude region, the combustion chamber 13 may aerate oxygen accurately, so that the utilization rate of the portable oxygen is improved. Due to high self-controllability, it can reduce the probability that the engine may be stall and out of control in a turboshaft form in the high altitude region.

The airway turbofans 11 includes two airway turbofans 11 which are arranged side by side along an air flowing direction, and the two airway turbofans 11 are both coaxially arranged with the high pressure turbine 10, so as to form twice of compression on the air flowing through the outer duct.

Preferably, a tail cone 12 that is connected and rotates coaxially with an end of the main shaft 1 is arranged in the main pushing chamber 19, and the high pressure turbine 10 and the two airway turbofans 11 are each coaxially connected to the tail cone 12. Since the screw gas compressor 6 at the front end of the engine is not good at hypervelocity rotation, a high speed reduction gear may be arranged inside the tail cone 12 to connect with the main shaft 1, and the high pressure turbofan is provided outside the tail cone 12. The high pressure turbofan is integrated with the tail cone 12 to operate reversely to the main shaft 1, so as to offset partial axial force.

Specifically, firstly, the air enters the inner duct and the outer duct through the main air intake fan 2. The air is pressurized to the first compressed air storage chamber 5 for the first time through the air intake compressor 4 as a compressor in the inner duct, and the pressure of the air may reach 0.2-0.3 MPA, so that the air is compressed to the primary compression air. The primary compression air enters the screw gas compressor 6 through the air inlet, is compressed for the second time and then enters the second compressed air storage chamber 7 through the one-way valve. At this time, the air pressure may reach 0.6-2.0 MPA. When the cam shaft 9 presses the valve stem, the gas in the second compressed air storage chamber 7 enters the combustion chamber 13. The high-pressure fuel nozzle starts to inject fuel so as to enable the fuel to mix with the air at a high pressure. At the same time, the sensor sends out a signal to the ignition plug when sensing that the stem drops. At this time, the fuel mixed gas in the combustion chamber 13 is ignited by the ignition plug, starts to explode, burn and generate the pulse gas, which is sprayed from the combustion chamber 13. So, the high pressure turbine 10 is pushed to do work. However, the gas which enters the outer duct is pushed to the two airway turbofans 11 through the main air intake fan to be compressed for the second time, then enters the main pushing chamber 19, and burns together with the fuel sprayed from the force applying nozzle. So, a burned gas is formed, and then the burned gas together with the gas sprayed from the combustion chamber 13 is sprayed out of the tail part of the main casing, so that the engine achieves the purpose of rotation.

In conclusion, the core of the present disclosure is to provide a device, which compresses the air to the combustion chamber with the ignition plug and the fuel injection mechanism through the screw gas compressor for burning and pushes the high pressure turbine at a tail of the device to do work by using generated expanded gas. The screw gas compressor with a reduction mechanism, the combustion chamber and the high pressure turbine are combined to form an internal combustion engine. The device for work done by compressed air of the present disclosure further is applied to turboshafts, turbofans and other applications.

Adaptive changes made according to the actual needs all fall in the protection scope of the present disclosure.

It is noted that the present disclosure is not limited to the details of the above exemplary embodiments for those skilled in the art, and those skilled in the art may implement the present disclosure in other specific forms without departing from the spirit and basic features of the present disclosure. Therefore, in any case, these embodiments herein should be regarded as the exemplary embodiments, rather than the restrictive embodiments. The scope of the present disclosure is limited by the appended claims instead of the above description. Therefore, all changes in the meaning and scope of the equal conditions of the claims shall be included in the present disclosure. Any reference sign in the claims shall not be regarded as a limitation to the involved claims.

Specific examples are provided in the present disclosure to set forth the principles and embodiments of the present disclosure, and the description of the above embodiments are merely used to help understand the method and its core concept of the present disclosure. Base on the concepts of the present disclosure, specific embodiments and the applied range may be modified by those of ordinary skill in the art. In conclusion, the contents of the specification shall not be understood as a limitation to the present disclosure.

We claim:

1. A device for work done by compressed air, the device comprising: an inner casing and a main shaft,
  wherein the main shaft extends in the inner casing along an axial direction of the inner casing, wherein an air intake compressor and a screw gas compressor are successively provided on the main shaft along a gas flowing direction, the inner casing is provided with an inner duct for introducing air into the air intake compressor at a front end of the air intake compressor, a first compressed air storage chamber for cooperating with the air intake compressor is arranged between the air intake compressor and the screw gas compressor, the air intake compressor is configured to pressurize the air, the first compressed air chamber communicates with the screw gas compressor, an air intake end of the screw gas compressor is provided with a fuel injection mechanism for injecting fuel inside the screw gas compressor, an air outlet end of the screw gas compressor is provided with two second compressed air storage chambers, the screw gas compressor is configured to pressurize air, the two second compressed air storage chambers communicate with a combustion chamber, the combustion chamber is configured to be injected with fuel, and an ignition mechanism for detonating a mixture of the fuel and the air is arranged in the combustion chamber;
  wherein the fuel injection mechanism comprises an injection nozzle of the screw gas compressor, the injection nozzle of the screw gas compressor faces towards an inlet of the screw gas compressor and injects the fuel inside the screw gas compressor.

2. The device for work done by compressed air according to claim 1, wherein the two second compressed air storage chambers are each provided with a first exhaust port, the first exhaust port communicates with the combustion chamber, the first exhaust port is provided with a first valve stem, and the first valve stem is sleeved with a first reset spring; one side, away from the first exhaust port, of the first valve stem is provided with a cam shaft; and the cam shaft is configured to synchronously rotate with the main shaft and to push the first valve stem to block the first exhaust port.

3. The device for work done by compressed air according to claim 2, wherein the two second compressed air storage chambers communicate with the screw gas compressor, and are arranged symmetrically about the main shaft; the first exhaust port and the first valve stem are coordinately arranged in one of the two second compressed air storage chambers, a second exhaust port is arranged on another one of the two second compressed air storage chambers and is symmetrical to the first exhaust port about the cam shaft, the second exhaust port is provided with and cooperates with a second valve stem and a second reset spring, the second reset spring is sleeved on the second valve stem, and the second valve stem and the first valve stem are arranged symmetrically with respect to the cam shaft.

4. The device for work done by compressed air according to claim 3, wherein a sensor is arranged on the first valve stem or the second valve stem, and the sensor is configured to monitor an action of the first valve stem or the second valve stem, and is electrically connected to the ignition mechanism.

5. The device for work done by compressed air according to claim 4, wherein the screw gas compressor comprises a gas compressor casing, and a screw structure is arranged inside the gas compressor casing; or, a three-screw structure with one male screw and two female screws is arranged inside the gas compressor casing, the three-screw structure comprises a male screw and two female screws, the male screw is coaxially connected and rotated with the main shaft, the two female screws are symmetrically arranged about the male screw and in transmission connection with the male screw, and the female screws are rotationally arranged on the gas compressor casing.

6. A dual-pressure jet engine, comprising a device for work done by compressed air, and a main casing, the device comprising: an inner casing and a main shaft, wherein the main shaft extends in the inner casing along an axial direction of the inner casing, wherein an air intake compressor and a screw gas compressor are successively provided on the main shaft along a gas flowing direction, the inner casing is provided with an inner duct for introducing air into the air intake compressor at a front end of the air intake compressor, a first compressed air storage chamber for cooperating with the air intake compressor is arranged between the air intake compressor and the screw gas compressor, the air intake compressor is configured to pressurize the air, the first compressed air chamber communicates with the screw gas compressor, an air intake end of the screw gas compressor is provided with a fuel injection mechanism for injecting fuel inside the screw gas compressor, an air outlet end of the screw gas compressor is provided with two second compressed air storage chambers, the screw gas compressor is configured to pressurize air, the two second compressed air storage chambers communicate with a combustion chamber, the combustion chamber is configured to be injected with fuel, and an ignition mechanism for detonating a mixture of the fuel and the air is arranged in the combustion chamber;

wherein the main casing is sleeved outside the device for work done by compressed air, two ends of the main casing are opened so as to form an inlet port and an outlet port, individually; a main air intake fan is arranged inside the inlet port of the main casing and communicates with the inner duct, and the outlet port of the main casing is provided with a main pushing chamber; the main pushing chamber communicates with the combustion chamber, the main shaft extends into the main pushing chamber and is coaxially sleeved with a high pressure turbine, the high pressure turbine directly faces to an air outlet of the combustion chamber, an outer duct is arranged between the main casing and the device for work done by compressed air, the outer duct and the inner duct communicate with the inlet port in parallel, and two airway turbofans for pressurizing the air in the outer duct are arranged between the high pressure turbine and the main pushing chamber.

7. The dual-pressure jet engine according to claim 6, wherein the fuel injection mechanism comprises an injection nozzle of the screw gas compressor, the injection nozzle of the screw gas compressor faces towards an inlet of the screw gas compressor and injects the fuel inside the screw gas compressor, and a fuel collecting pipeline for collecting and recycling the fuel flowing out of the screw gas compressor is arranged at lower portions inside the two second compressed air storage chambers.

8. The dual-pressure jet engine according to claim 7, wherein the two second compressed air storage chambers are each provided with a first exhaust port, the first exhaust port communicates with the combustion chamber, the first exhaust port is provided with a first valve stem, and the first valve stem is sleeved with a first reset spring;

one side, away from the first exhaust port, of the first valve stem is provided with a cam shaft; and the cam shaft is configured to synchronously rotate with the main shaft and to push the first valve stem to block the first exhaust port.

9. The dual-pressure jet engine according to claim 8, wherein the two second compressed air storage chambers communicate with the screw gas compressor, and are arranged symmetrically about the main shaft; the first exhaust port and the first valve stem are coordinately arranged in one of the two second compressed air storage chambers, a second exhaust port is arranged on another one of the two second compressed air storage chambers and is symmetrical to the first exhaust port about the cam shaft, the second exhaust port is provided with and cooperates with a second valve stem and a second reset spring, the second reset spring is sleeved on the second valve stem, and the second valve stem and the first valve stem are arranged symmetrically with respect to the cam shaft.

10. The dual-pressure jet engine according to claim 9, wherein a sensor is arranged on the first valve stem or the second valve stem, and the sensor is configured to monitor an action of the first valve stem or the second valve stem, and is electrically connected to the ignition mechanism.

11. The dual-pressure jet engine according to claim 10, wherein the screw gas compressor comprises a gas compressor casing, and a screw structure is arranged inside the gas compressor casing; or, a three-screw structure with one male screw and two female screws is arranged inside the gas compressor casing, the three-screw structure comprises a male screw and two female screws, the male screw is coaxially connected and rotated with the main shaft, the two female screws are symmetrically arranged about the male screw and in transmission connection with the male screw, and the female screws are rotationally arranged on the gas compressor casing.

12. The dual-pressure jet engine according to claim 11, wherein the two airway turbofans are arranged side by side along an air flowing direction, and are both coaxially arranged with the high pressure turbine.

13. The dual-pressure jet engine according to claim 12, wherein a tail cone is arranged in the main pushing chamber, the tail cone is connected and rotated coaxially with an end part of the main shaft, and the high pressure turbine and the two airway turbofans are each coaxially connected to the tail cone.

* * * * *